(12) United States Patent
Deluca et al.

(10) Patent No.: US 11,004,127 B2
(45) Date of Patent: May 11, 2021

(54) METHOD, SYSTEM, AND MANUFACTURE FOR PROVIDING BETTER CUSTOMER SERVICE BY ANALYZING CUSTOMER COMMUNICATIONS

(71) Applicant: International Business Machines Corporation, Armonk, NY (US)

(72) Inventors: Marco A. Deluca, Ontario (CA); Timothy M. Francis, Ontario (CA); Leho Nigul, Ontario (CA); Brian W. Thomson, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 15/845,264

(22) Filed: Dec. 18, 2017

(65) Prior Publication Data

US 2018/0108060 A1    Apr. 19, 2018

Related U.S. Application Data

(63) Continuation of application No. 15/281,650, filed on Sep. 30, 2016, now Pat. No. 9,852,459.

(51) Int. Cl.
*G06Q 30/00*   (2012.01)
*G06Q 30/06*   (2012.01)
(Continued)

(52) U.S. Cl.
CPC ......... *G06Q 30/0613* (2013.01); *G06Q 30/01* (2013.01); *G06Q 30/0203* (2013.01);
(Continued)

(58) Field of Classification Search
CPC .................. G06Q 30/0601–0645; G06Q 30/08
(Continued)

(56) References Cited

U.S. PATENT DOCUMENTS

2003/0200135 A1    10/2003  Wright
2011/0178863 A1*    7/2011  Daigle ............... G06Q 30/0231
                                                        705/14.31
(Continued)

OTHER PUBLICATIONS

CallCopy, Capturing Voice of the Customer: A New Role for Customer Surveys, Speech Analytics and Quality Management, 2011, Whitepaper, accessed at [https://cdn.ymaws.com/www.ccmg.org.za/resource/resmgr/files/news/capturing_the_voice_of_the_c.pdf] (Year: 2011).*

(Continued)

*Primary Examiner* — Jeffrey A. Smith
*Assistant Examiner* — Lindsey B Smith
(74) *Attorney, Agent, or Firm* — Scully, Scott, Murphy & Presser, P.C.; Stephanie Carusillo

(57) ABSTRACT

The present disclosure provides a system and method for analyzing customer communications to provide better customer service including generating customer related data from communications of a customer by at least one sensing device located in a venue, transmitting the generated customer related data to an analysis engine, determining based on an analysis of the customer related data a customer experience, identifying at least one suggestion to provide better customer service including the identification of a representative of the venue that the analysis engine has determined can assist the customer, and receiving the at least one suggestion including an indication that the representative should assist the customer from the analysis engine by a computing device associated with the representative of the venue.

18 Claims, 4 Drawing Sheets

(51) Int. Cl.
    *H04L 29/08*       (2006.01)
    *G06Q 30/02*       (2012.01)
(52) U.S. Cl.
    CPC ..... *G06Q 30/0631* (2013.01); *G06Q 30/0641* (2013.01); *G06Q 30/0643* (2013.01); *H04L 67/18* (2013.01); *H04L 67/22* (2013.01)
(58) Field of Classification Search
    USPC .............................................. 705/26.1–27.2
    See application file for complete search history.

(56) References Cited

U.S. PATENT DOCUMENTS

| | | | |
|---|---|---|---|
| 2011/0202472 A1 | 8/2011 | Wan et al. | |
| 2013/0159127 A1* | 6/2013 | Myslinski | G06Q 30/00 |
| | | | 705/26.1 |
| 2013/0204998 A1 | 8/2013 | Russell et al. | |
| 2014/0363059 A1* | 12/2014 | Hurewitz | G06Q 30/0201 |
| | | | 382/118 |
| 2015/0112826 A1* | 4/2015 | Crutchfield, Jr. | G06Q 30/0601 |
| | | | 705/26.1 |
| 2015/0348163 A1* | 12/2015 | Tamblyn | G06Q 30/0631 |
| | | | 705/26.7 |
| 2016/0042359 A1 | 2/2016 | Singh | |

OTHER PUBLICATIONS

Wayback Machine of Softbank Robotics, Overview How Pepper Works, Captured using WaybackMachine on May 24, 2016, accessed at [https://web.archive.org/web/20160524105744/https://developer.softbankrobotics.com/us-en/documents/how-perpper-works], accessed on Aug. 2, 2017, 3 pages.

Softbank Robotics, Overview How Pepper Works, Softbank Robotics Developer Documents, accessed at [https://developer.softbankrobotics.com/us-en/documents/how-pepper-works], Accessed on Aug. 2, 2017, 3 pages.

List of IBM Patents or Patent Applications Treated as Related, dated Dec. 18, 2017, 2 pages.

* cited by examiner

METHOD, SYSTEM, AND MANUFACTURE FOR PROVIDING BETTER CUSTOMER SERVICE BY ANALYZING CUSTOMER COMMUNICATIONS

CROSS-REFERENCE TO RELATED APPLICATIONS

This application is a continuation of U.S. patent application Ser. No. 15/281,650 filed Sep. 30, 2016 which is incorporated by reference herein in its entirety.

TECHNICAL FIELD

The present disclosure relates to the analysis of customer communications to provide better customer service.

BACKGROUND

Brick and mortar stores or other venues often include many aisles, pathways, etc., storing different goods for purchase by customers. Often each aisle will have a sign indicating generic or general categories of goods that the aisle includes. In some cases, however, a visiting customer may have trouble locating an item of interest in the aisles. For example, the customer may be unsure of the category to which the item belongs or simply may not be able to locate the item within the appropriate aisle itself. Customer frustration over an inability to quickly and efficiently find the item of interest may cause the customer to leave the store without purchasing anything, provide bad reviews of the store, or other similar negative outcomes. In addition, if the customer desires help in finding the specific item of interest but is unable to locate a store employee in the vicinity, or if the located store employee does not know where the specific item is, the customer frustration may increase thereby tarnishing the reputation of the store.

BRIEF SUMMARY

The system, method, and computer program product described herein analyze customer communications to provide better customer service.

In an aspect of the present disclosure, a method for providing better customer service by analyzing customer communications is disclosed. The method includes generating customer related data from communications of a customer in a venue by at least one sensing device located in the venue, and transmitting the generated customer related data to an analysis engine. The analysis engine is configured to analyze the generated customer related data, determine based on the analysis a customer experience, and identify at least one suggestion to provide better customer service, the at least one suggestion comprising the identification of a representative of the venue that the analysis engine has determined can assist the customer. The method further includes receiving, by a computing device associated with the representative of the venue, the at least one suggestion from the analysis engine. The at least one suggestion includes an indication that the representative should assist the customer.

In aspects of the present disclosure apparatus, systems, and computer program products in accordance with the above aspect may also be provided.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

The present disclosure provides methods and systems that analyze customer communications to provide better customer service.

Figure 1:
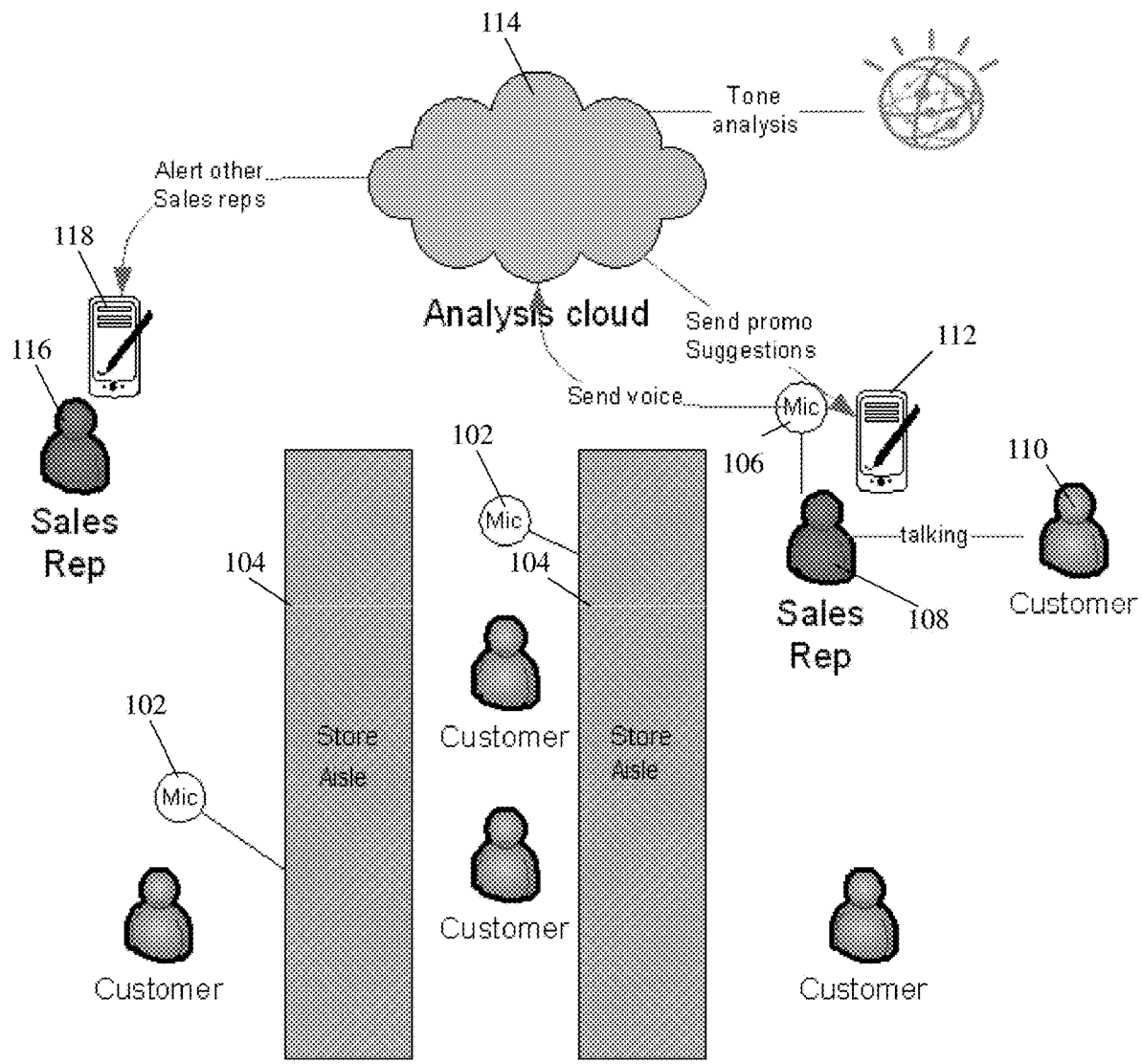
FIG. 1 is a system diagram in accordance with an aspect of the present disclosure.

With reference now to FIG. 1, a system 100 for detecting and taking action on a customer's experience in a venue. System 100 gathers customer related data through the use of sensing devices 102 located throughout the venue. For example, sensing devices 102 may be located on or in aisles 104, mounted to venue structures such as the walls, ceiling, columns, or other similar hard points, or located in any other venue location. Sensing devices 102 may include, for example, microphones, video cameras, or other similar sensing devices. The venue may include, for example, brick and mortar stores, open air store spaces, concert venue's sporting venues, or any other venue where sensing devices 102 may be located and where a customer experience may be monitored.

In some aspects, customer related data may include, for example, audio data, video, data or any other data that may indicate how a customer is experiencing the venue. For example, the customer related data may include an indication that a customer is having difficulty in a venue. For example, sensing devices 102 may monitor any verbal communications or body motions of the customer including but not limited to, the customer's communications with other customers, the customer's communications with representatives of the venue, pacing, erratic behavior, arm waving, or any other customer communications or actions regardless of whether or not they are directed toward a particular individual in the venue. For example, a customer may be searching an aisle for a particular product and may complain to no one in particular about how hard the product is to find. In this case sensing devices 102 may capture the complaint as customer related data for analysis by an analysis engine. In another example, the customer may be having a conversation on a cellular telephone regarding the product that the customer is looking for. Sensing devices 102 may also capture the customer's side of the conversation as customer related data for analysis to determine if the customer is experiencing difficulty, e.g., struggling to find a particular product or otherwise requiring assistance. In some aspects, sensing devices 102, e.g., a video camera, may capture body motions of the customer, e.g., erratic waving of the arms or other similar motions that may indicate that the customer is having difficulty, e.g., the customer is exhibiting signs of frustration due to the struggle with finding a particular product.

System 100 may also gather the customer related data through the use of sensing devices 106 associated with representatives 108. For example, a representative 108 may wear or carry a sensing device 106 such as a microphone, video camera or other similar sensing device, such that any interactions or communications of a customer 110 or between representative 108 and the customer 110 may be recorded.

In some aspects, representative 108 may also carry a computing device 112 that may be used by the representative to input customer related data, item related data, or any other data that may help in assisting the customer. Computing device 112 may also receive and display data including a course of action or answer for the customer.

In some aspects, the customer related data gathered by sensing devices 102 and 106, and by computing device 112 may be sent to the cloud for remote analysis by an analysis engine 114. For example, the analysis engine 114, e.g., IBM Watson®, may be configured to analyze the received customer related data from sensing devices 102 and 106, and from computing device 112, to detect a tone of a customer's communications, determine a length of the communications, detect key phrases used by the customer or a representative, translate voice to text, and analyze the text to generate possible suggestions for how to improve the customer's experience and provide better customer service to the customer. For example, analysis engine 114 may analyze the customer related data received from sensing devices 102 and 106 and determine that a customer is exhibiting negative emotions. For example, analysis engine 114 may analyze the customer's voice or tone to determine whether the customer is exhibiting negative emotions during a conversation. In response to determining that the customer is displaying negative emotions during a conversation, analysis engine 114 may transmit a promotional offer to computing device 112 for display to the customer including a promotion relevant to the customer's topic of conversation or relevant to the topic that caused the customer's display of negative emotions. In some aspects, for example, the promotional offer may be transmitted to a device of the customer, e.g., smart phone, smart watch, other smart wearable device, or other device, etc. For example, the promotional offer may be transmitted to the customer via Bluetooth, WI-FI, or other similar short range wireless communication standards. In some aspects, the promotional offer may be transmitted to the customer via, for example, e-mail, text, or other similar forms of communication.

In some aspects, analysis engine 114 may determine based on the analysis that the representative 108 is not able to assist customer 110 effectively. For example, the analysis may determine that the representative 108 has stated a key phrase such as "I don't work in this department", the analysis may determine that the length of the communication between customer 110 and representative 108 has extended beyond a pre-determined threshold amount of time, the analysis may determine that a tone of customer 110 in the communication indicates an increasing amount of frustration with the representative 108 or with a lack of progress in assisting the customer with the customer's experience, or other similar determinations.

In some aspects, analysis engine 114 may supply representative 108 with information for assisting with the customer's experience and providing better customer service, for example, via computing device 112, a speaker associated with representative 108, or other similar communication means. For example, the analysis engine 114 may supply the representative 108 with information on a particular product, directions for where the product is, or other similar information that may be utilized to improve the customer's experience and provide better customer service.

In some aspects, when the analysis engine 114 determines that representative 108 is not able to effectively assist the customer 110 with the customer's experience, analysis engine 114 may identify another representative 116 as a representative that may be able to assist the customer more effectively. For example, analysis engine 114 may analyze a personnel file associated with representative 116 that shows representative 116 has having familiarity with the item or category of items identified by the analysis engine 114 as being the topic of the communications between customer 110 and representative 106. Analysis engine 114 may also determine that representative 116 is not currently engaged with another customer, for example, through the use of sensing devices 102 or 106, and that the representative 106 is available in the venue, e.g., through the use of sensing devices 102 or 106, via a computing device 118 associated with representative 116, or through other location detection methods. For example, GPS coordinates, wireless triangulation, or other similar methods determining a location of computing device 118 may be used to determine representative 116's location.

In some aspects, representative 116 may be provided with the customer 110's location by analysis engine 114, e.g., via computing device 118, a speaker earbud, or other similar presentation device. For example, analysis engine 114 may provide a map of the venue to representative 116 including an indication of where the customer 110 is located. The location of the customer 110 may be determined, for example, based on the location of representative 108 (e.g., by determining a location of computing device 112), based on a known location of one or more of the sensing devices 102 that are capturing customer related data from customer 110, or other similar location determination methods.

In some aspects, the customer related data may be analyzed by analysis engine 114 to determine a set of promotions that may be provided to customer 110 by representatives 108 or 116 via computing devices 112 or 118. For example, if the customer related data indicates that the customer has a specific need, e.g., a particular ailment, a particular dish that they wish to cook, etc., analysis engine 114 may determine what products may meet that need and may provide a promotion for a suitable product to the customer 110 via computing devices 112 or 118. In some aspects, analysis engine 114 may provide the promotion directly to the customer via a customer device, e.g., smart phone, smart watch, table, or other similar device, if the customer has registered with the venue, downloaded application associated with the venue, or provided contact information such as an e-mail address.

Figure 2:
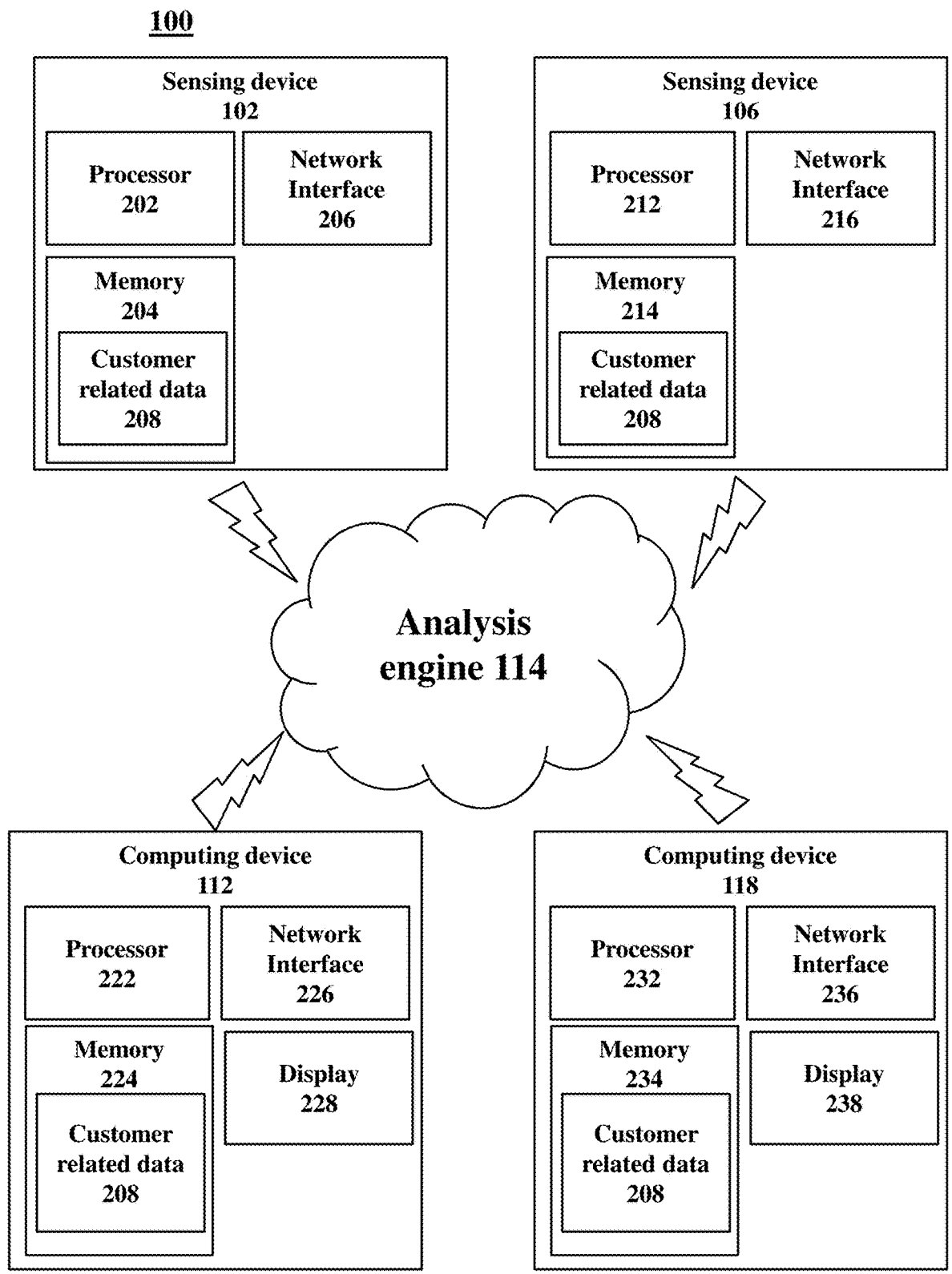
FIG. 2 is a block diagram of the system of FIG. 1 in accordance with an aspect of the present disclosure.

Referring now to FIG. 2, in another illustration of system 100, sensing devices 102 may include at least one processor 202, memory 204, a network interface 206, and any other feature commonly found in a computing device. Sensing devices 102 may generate and store customer related data 208 in memory 204 and may wired or wirelessly transmit the customer related data to analysis engine 114 using network interface 206. In some aspects, processor 202, memory 204, and network interface 206 may be located remotely from sensing devices 102, e.g., on a computing device (not shown) associated with the venue and the customer related data 208 may be transmitted from sensing devices 102 to analysis engine 114 indirectly via the computing device associated with the venue. For example, each sensing devices 102 may include a simple microphone that may communicate the generated customer related data to the computing device associated with the venue via wired or wireless technology and the computing device may then transmit the customer related data to the analysis engine 114.

In some aspects, sensing devices 106 may include at least one processor 212, memory 214, a network interface 216, and any other feature commonly found in a computing device, similar to sensing devices 102. Sensing device 106 may generate and store customer related data 208 in memory 214 and may wired or wirelessly transmit the customer related data to analysis engine 114 using network interface 216. In some aspects, processor 212, memory 214, and network interface 216 may be located remotely from sensing devices 106, e.g., on a computing device 112 associated with the representative 108 and the customer related data 208 may be transmitted from sensing devices 106 to analysis engine 114 indirectly via the computing device 112. For example, sensing devices 102 may include a microphone attached or held by representative 108. In some aspects, sensing device 106 may be included as part of computing device 112.

With continued reference to FIG. 2, in some aspects, computing device 112 may include at least one processor 222, memory 224, a network interface 226, a display 228 and any other feature commonly found in a computing device. Computing device 112 may generate and store customer related data 208 in memory 224 in a similar manner to sensing device 106 and may wired or wirelessly transmit the customer related data 208 to analysis engine 114 using network interface 226. In some aspects, computing device 112 may be a portable computing device 112 such as, for example, a tablet, smart phone, smart watch, smart wearable technology, laptop, or other similar portable computing device. In some aspects, computing device 112 may be a kiosk or other computing device 112 that is positioned within the venue for use by the representative to assist customers. In some aspects, computing device 112 may transmit the customer related data 208 to analysis engine 114 and may receive data or other information back from analysis engine 114 that analysis engine 114 has determined will assist the customer including, for example, a suggested product, promotions, answers to questions, an indication of which aisle contains an item of interest that will remedy the customer's difficulty, where in the aisle the item resides, or other similar data or other information. In some aspects, computing device 112 may receive the data or other information from analysis engine 114 based on customer related data 208 that was transmitted to analysis engine 114 by another device, e.g., sensing devices 102 or 106. Computing device 112 may be configured to display the received data or other information on display 228 for review by representative 108 or customer 110.

In some aspects, computing device 118 may include at least one processor 232, memory 234, a network interface 236, a display 238 and any other feature commonly found in a computing device, similar to computing device 112. In some aspects, computing device 116 may be a portable computing device 118 such as, for example, a tablet, smart phone, smart watch, smart wearable technology, laptop, or other similar portable computing device. In some aspects, computing device 118 may be a kiosk or other computing device 118 that is positioned within the venue for use by the representative 116 to assist customers. In some aspects, computing device 118 may receive an indication from analysis engine 114 that analysis engine 114 has determined a customer 110 is in need of further assistance. For example, computing device 118 may receive a location of the customer 110 and an indication of what the customer's is experiencing in the venue that caused the customer to require assistance. In some aspects, analysis engine 114 may provide computing device 118 with a suggested product, promotions, answers to questions, an indication of which aisle contains the item of interest and where in the aisle the item resides, or other similar data or other information. In some aspects, computing device 118 may receive the data or other information from analysis engine 114 based on customer related data 208 that was transmitted to analysis engine 114 by another device, e.g., sensing devices 102 or 106 or computing device 112. Computing device 118 may be configured to display the received data or information on display 238 for review by representative 116. For example, computing device 118 may display a map on display 238 indicating a location of the customer 110 and/or representative 108 that is currently helping the customer 110.

With continued reference to FIG. 2, analysis engine 114 is configured to analyze both structured and unstructured customer related data by applying advanced natural language processing, information retrieval, knowledge representation, automatic cognitive reasoning, and machine learning technologies. In some aspects, analysis engine 114 may be trained using venue related data including, for example, item inventory and locations, item descriptions, or any other item related data. In some aspects, analysis engine 114 may be trained to detect a tone of conversation. For example, analysis engine 114 may receive a large database of tones as a training input and may be trained to determine a difference between tones of voice using the training input. The trained analysis engine 114 may then be used to determine a tone of the customer 110's conversation, e.g., happy, sad, mad, angry, frustrated, ambivalent, stressed, etc. Analysis engine 114 may also be trained in how to respond to the various tones or other data, for example, by making suggestions to representative 108 via computing device 112, contacting representative 116 to help the customer via computing device 118, or other similar responses. For example, analysis engine 114 may be initially trained by question/answer pairs based on the tone database or other databases. In some aspects, analysis engine 114 may also be trained as representatives answer customer questions. An example analysis engine 114 that may be used to analyze customer communications to detect and take action on a customer's in-store difficulties is IBM Watson®.

Figure 3:
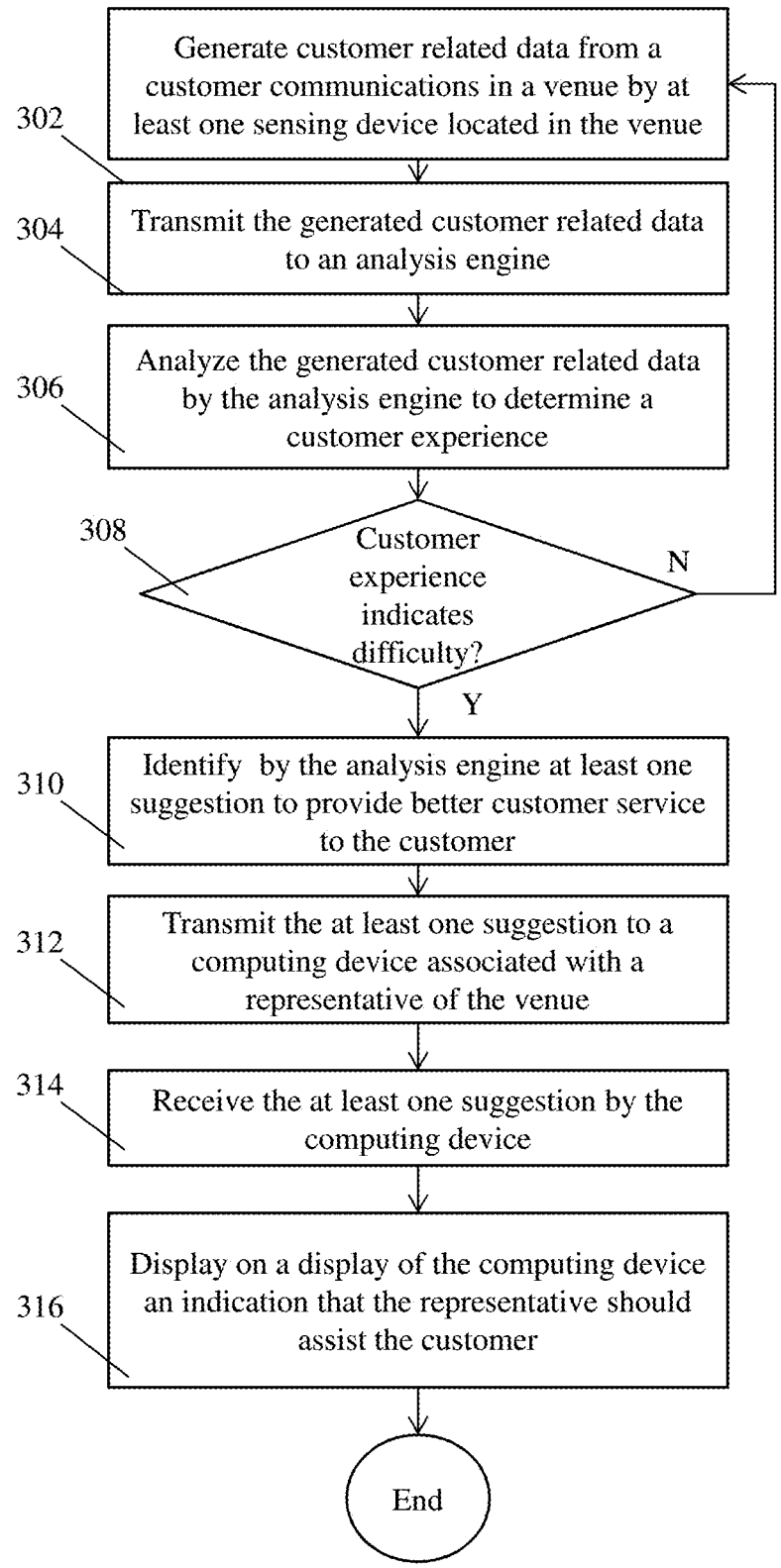
FIG. 3 is a flow chart of a method according to an embodiment of the present disclosure.

With reference now to FIGS. 1-3, a method 300 for providing better customer service by analyzing customer communications is disclosed. At 302, customer related data 208 is generated from communications by a customer 110 by at least one sensing device 102 or 106 located in the venue. For example, any time the customer speaks, audio data may be captured and customer related data 208 may be generated based on the captured audio data.

At 304, the generated customer related data 208 is transmitted to an analysis engine 114. For example, the analysis engine 114 may be located remotely from the venue.

At 306, the analysis engine 114 analyzes the generated customer related data 208 to determine a customer experience of the customer 110 in the venue. For example, the analysis engine 114 may analyze a tone of the communications, a length of the communications, a use of key phrases by the customer or by a representative of the venue, translate the voice to text, analyze the text, or other similar forms of analysis to determine the customer experience.

At 308, analysis engine 114 determines whether the customer experience of the customer 110 indicates that the customer is experiencing a difficulty in the venue. If analysis engine 114 determines that the customer 110 is not experiencing a difficulty, the at least one sensor 102 or 106 continues to generate customer related data at 302 based on customer communications. If the analysis engine 114 determines that the customer 112 is experiencing a difficulty, analysis engine 114 identifies at least one suggestion to provide better customer service to the customer at 310. For example, the at least one suggestion may include the identification of a representative 116 of the venue that the analysis engine 114 has determined can assist the customer 110 with the difficulty.

At 312, analysis engine 114 transmits the at least one suggestion to a computing device 118 associated with the representative 116 of the venue.

At 314, computing device 118 receives the at least one suggestion from the analysis engine 114 and in response to receiving the at least one suggestion, displays on a display of the computing device 114, an indication that the representative should assist the customer with the customer's experience at 316.

Figure 4:
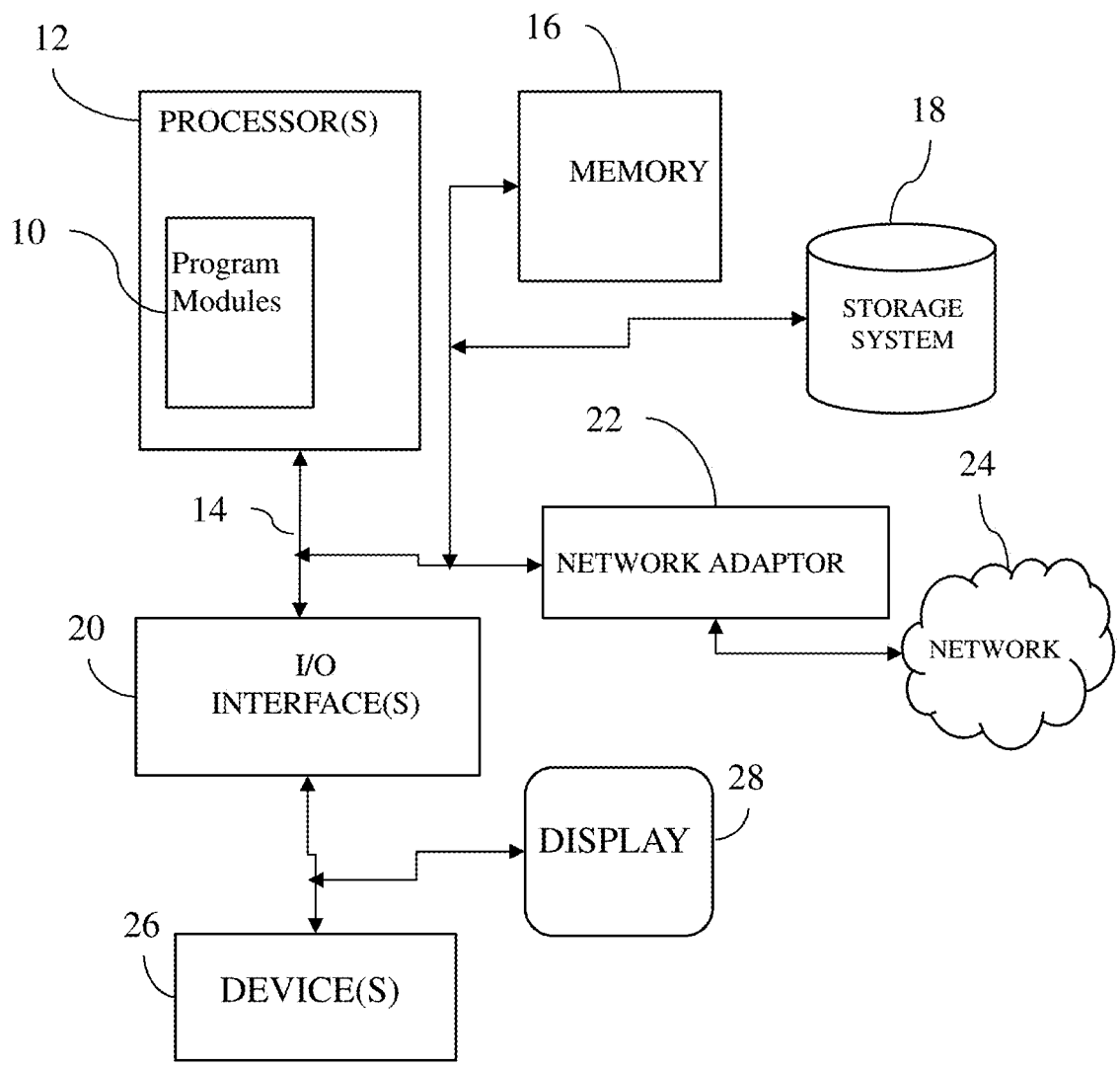
FIG. 4 is an exemplary block diagram of a computer system in which processes involved in the system, method, and computer program product described herein may be implemented.

FIG. 4 illustrates a schematic of an example computer or processing system that may implement any portion of system 100, system 200, sensing device 102, sensing device 106, computing device 112, analysis engine 114, computing device 118, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor for detecting and taking action on a customer's experience in a venue, comprising:
generating customer related data from communications of a customer in the venue by at least one sensing device mounted to a structure of the venue at a known location in the venue;
transmitting the generated customer related data from the at least one sensing device to an analysis engine on a separate device, the analysis engine configured to:
analyze the generated customer related data by applying natural language processing, cognitive reasoning and machine learning technologies to detect a tone of the customer's communications;
determine a location of the customer in the venue based on the known location of the at least one sensing device in the venue;
determine a length of the communications of the customer based on the analysis;
determine a customer experience based on the determined length of the communications; and
identify at least one suggestion to provide better customer service based at least in part on the detected tone of the customer's communications, the determined customer experience, and the determined length of the communications, the at least one suggestion comprising the identification of a representative of the venue that the analysis engine has determined can assist the customer;
receiving, by a further, separate computing device associated with the representative of the venue, the at least one suggestion from the analysis engine and the determined location of the customer in the venue, the at least one suggestion comprising an indication that the representative should assist the customer; and
in response to receiving the at least one suggestion, displaying on a display of the computing device associated with the representative of the venue, the indication that the representative should assist the customer and an indication of the customer's location in response to receiving the at least one suggestion.

2. The method of claim 1 wherein the indication of the customer's location comprises a map including the customer's location, the computing device associated with the representative of the venue displaying the map on the display in response to receiving the at least one suggestion from the analysis engine.

3. The method of claim 1, wherein the customer related data is unstructured data and the analysis engine is configured to analyze unstructured data to generate the at least one suggestion.

4. The method of claim 1, wherein the analysis engine is configured to:
determine the customer experience based on the determined tone of the communications.

5. The method of claim 1, wherein the analysis engine is configured to:
detect key phrase in the communications of the customer;
determine the customer experience based on the detected key phrase;
identify the at least one suggestion based at least in part on the detected key phrase in the communications of the customer.

6. The method of claim 1, wherein the analysis engine is configured to:
translate the communications of the customer into text;
analyze the text to determine the customer experience; and
identify the at least one suggestion based at least in part on the analysis of the text.

7. A system for detecting and taking action on a customer's experience in a venue, the system comprising:
at least one sensing device mounted to a structure of the venue at a known location in the venue and configured to generate customer related data from a communications of a customer in the venue, the at least one sensing device configured to transmit the customer related data from the at least one sensing device to an analysis engine on a separate device, the analysis engine configured to analyze the generated customer related data by applying natural language processing, cognitive reasoning and machine learning technologies to detect a tone of the customer's communications, to determine a location of the customer in the venue based on the known location of the at least one sensing device in the venue, to determine a length of the communications of the customer based on the analysis, to determine a customer experience based on the determined length of the communications, and to identify at least one suggestion to provide better customer service based at least in part on the detected tone of the customer's communications, the determined customer experience, and the determined length of the communications, the at least one suggestion comprising the identification of a representative of the venue that the analysis engine has determined can assist the customer; and a further, separate computing device associated with the representative of the venue, the computing device configured to
  receive the at least one suggestion from the analysis engine and the determined location of the customer in the venue, the at least one suggestion comprising an indication that the representative should assist the customer, and
  in response to receiving the at least one suggestion, display on a display of the computing device associated with the representative of the venue, the indication that the representative should assist the customer and an indication of the customer's location in response to receiving the at least one suggestion.

8. The system of claim 7, wherein the indication of the customer's location comprises a map including the customer's location, the computing device associated with the representative of the venue displaying the map on the display in response to receiving the at least one suggestion from the analysis engine.

9. The system of claim 7, wherein the customer related data is unstructured data and the analysis engine is configured to analyze unstructured data to generate the at least one suggestion.

10. The system of claim 7, wherein the analysis engine is configured to:
  determine the customer experience based on the determined tone of the communications.

11. The system of claim 7, wherein the analysis engine is configured to:
  detect key phrase in the communications of the customer;
  determine the customer experience based on the detected key phrase;
  identify the at least one suggestion based at least in part on the detected key phrase of the communications.

12. The system of claim 7, wherein the analysis engine is configured to:
  translate the communications of the customer into text;
  analyze the text to determine the customer experience; and
  identify the at least one suggestion based at least in part on the analysis of the text.

13. A non-transitory computer program product comprising instructions that, when executed by at least one hardware processor, configure the at least one hardware processor to implement a method for detecting and taking action on a customer's experience in a venue, the method comprising:
  generating customer related data from communications of a customer in the venue by at least one sensing device mounted to a structure of the venue at a known location in the venue;
  transmitting the generated customer related data from the at least one sensing device to an analysis engine on a separate device, the analysis engine configured to:
    analyze the generated customer related data by applying natural language processing, cognitive reasoning and machine learning technologies to detect a tone of the customer's communications;
    determine a location of the customer in the venue based on the known location of the at least one sensing device in the venue;
    determine a length of the communications of the customer based on the analysis;
    determine a customer experience based on the determined length of the communications; and
    identify at least one suggestion to provide better customer service based at least in part on the detected tone of the customer's communications, the determined customer experience, and the determined length of the communications, the at least one suggestion comprising the identification of a representative of the venue that the analysis engine has determined can assist the customer;
  receiving, by a further, separate computing device associated with the representative of the venue, the at least one suggestion from the analysis engine and the determined location of the customer in the venue, the at least one suggestion comprising an indication that the representative should assist the customer; and
  in response to receiving the at least one suggestion, displaying on a display of the computing device associated with the representative of the venue, the indication that the representative should assist the customer and an indication of the customer's location in response to receiving the at least one suggestion.

14. The non-transitory computer program product of claim 13, wherein:
  the communications of the customer are communications between the customer and a second representative; and
  the identification of the representative of the venue that the analysis engine has determined can assist the customer is based on a determination that the representative can assist the customer better than the second representative.

15. The method according to claim 1, wherein:
  the analysis engine is configured to analyze the generated customer related data to determine a promotion for the customer, and to provide the promotion directly to the customer via the computing device associated with the representative of the venue; and
  the receiving, by a computing device associated with the representative of the venue, the at least one suggestion from the analysis engine includes the computing device associated with the representative of the venue receiving the promotion from the analysis engine.

16. The method according to claim 1, wherein:
  the analyzing the generated customer related data includes analyzing the tone of the customer's communications to determine whether the customer is exhibiting negative emotions during a conversation; and
  the receiving the at least one suggestion from the analysis engine includes in response to determining that the customer is displaying negative emotions during the conversation, the analysis engine transmitting a promotional offer to the further, separate computing device associated with the representative of the venue for display to the customer.

17. The method according to claim 1, wherein:
  the analysis engine is trained to detect the tone of the customer's communications by
    receiving a database of tones as a training input, and
    determining a difference between tones of voice using the training input.

18. The method according to claim 17, wherein the analysis engine is trained as the representative of the venue answers questions of the customer.

* * * * *